Nov. 23, 1943.   H. E. WRIGHT   2,335,139
MANUFACTURE OF RUBBER ARTICLES
Filed Sept. 25, 1940
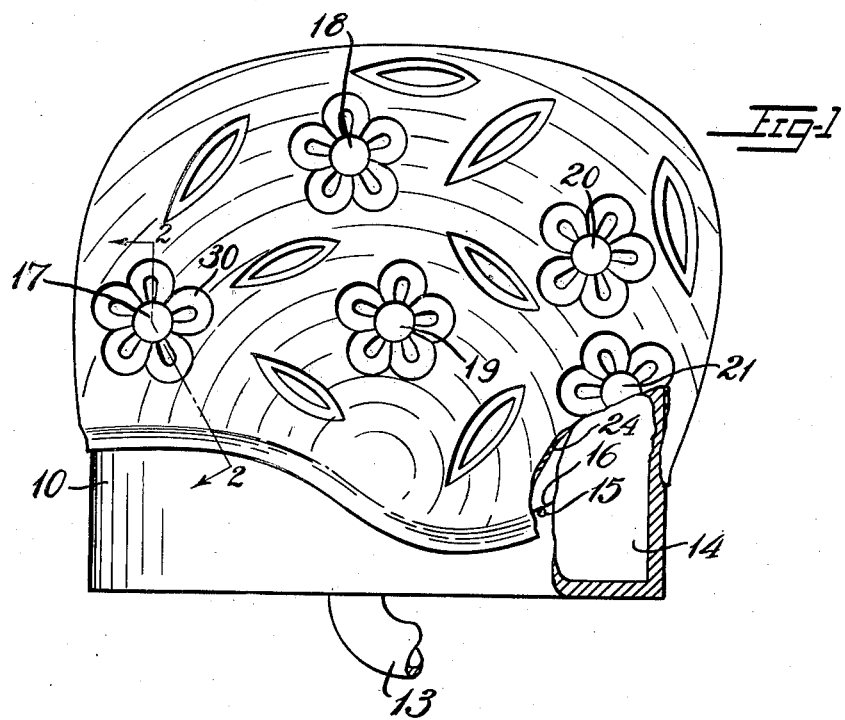
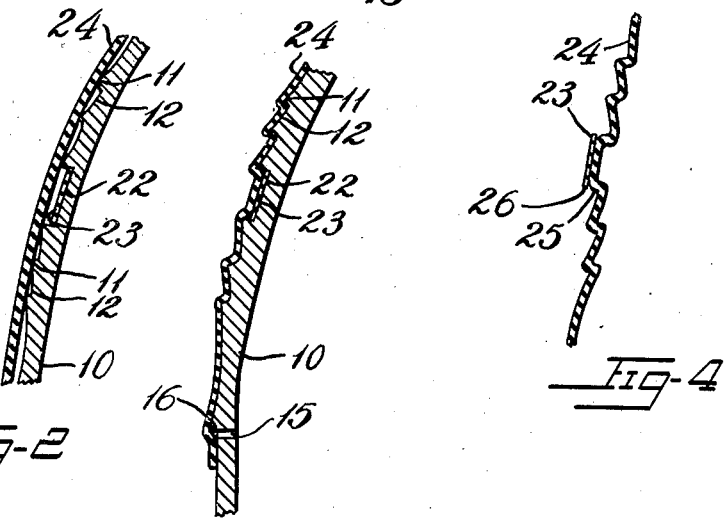
Inventor
Helen E. Wright
By Willis F. Avery
Atty Patented Nov. 23, 1943

2,335,139

UNITED STATES PATENT OFFICE 2,335,139

MANUFACTURE OF RUBBER ARTICLES

Helen E. Wright, Akron, Ohio, assignor to The B. F. Goodrich Company, New York, N. Y., a corporation of New York Application September 25, 1940, Serial No. 358,238

6 Claims. (Cl. 18—61)

This invention relates to the manufacture of rubber articles and is especially useful in the manufacture of decorated articles of wearing apparel, such for example, as bathing caps.

In the manufacture of articles of rubber used as wearing apparel, such for example, as bathing caps, it is desirable to provide a decorative surface of contrasting colors. Caps and similar articles have been molded by use of confining molds but such caps, while provided with decorative surfaces formed by engraved surfaces of the molds, have been ralatively stiff and uncomfortable, due to the thick wall surface required by such method for successful operation, and when it has been attempted to employ materials of contrasting colors in the same molds, the colors of the resulting article have not been clear and sharply defined due to smearing of the materials under pressure.

Caps and similar articles have been made of sheeted rubber by cutting and seaming and ornaments of contrasting colors have been applied thereto by use of cement, but while the ornaments have been well defined, the cement has caused discoloration of the article, as it has shown through the translucent materials even where carefully confined to the desired area. The placing of ornaments of contrasting color on such a cap has required great skill and where several ornaments have been desired in spaced relation such spacing has been beyond the skill of the ordinary workman. Caps made from flat sheeted material while fitting the head with more comfort than the molded caps, have wrinkled and have not conformed well to the shape of the head and therefore have not properly displayed designs of contrasting color applied thereto.

It has been proposed to cement contrasting ornaments to a cap made by seaming flat sheeted material and then to form the cap over a three dimensional form while vulcanizing the rubber, but the ornaments are readily dislodged from the cap during placing of the cap on the form and the proper distribution of the ornaments over the surface of the finished cap, especially where the ornaments are between the sheeted material and the form for confining the ornaments under pressure, has been extremely difficult.

Objects of the present invention are to overcome the difficulties and disadvantages of the prior methods, to provide a neat article having ornaments of contrasting color, to provide for accurate placing of the ornaments, to provide ornaments having a three-dimensional appearance, to provide against shifting of the ornaments during placing of the article on the curing form, to provide compound decorative effects, and generally to provide an improved article and procedure.

These and other objects will appear from the following description and the accompanying drawing.

Of the drawing,

Figure 1 is a side elevation of a curing form with a bathing cap formed thereon, part of the cap and part of the form being broken away to show the construction.

Fig. 2 is a cross sectional view taken on line 2—2 of Fig. 1 showing a portion of the curing form with a cap and an ornament of sheeted material thereon before forming and vulcanization have been accomplished.

Fig. 3 is a similar view showing the form and the ornamented cap after vulcanization.

Fig. 4 is a detail sectional view of the finished cap at the ornament.

Referring to the drawing, the procedure of the invention generally comprises the placing of ornaments of rubber or other rubber-like material in cavities of a suitable form for the purpose, placing an article of rubber or other rubber-like material over the form without disturbing the ornaments, and uniting the article and the ornaments by fluid pressure applied to the article. In the article of the invention, the ornaments of material contrasting with the body of the article are well elevated with respect to its general contour and are sharply defined and in some forms of the invention are elevated on pedestals of smaller area so as to provide a distinctively three dimensional appearance. The invention also includes the provision of a suitable form for protecting the ornaments before assembly and for forming the finished article, all of which will be more readily apparent from the drawing and the more detailed description which follows.

The numeral 10 designates a curing or vulcanizing form of hollow construction having the shape of the desired article. In the example shown, the form is generally shaped like the head of a person so that the cap formed thereon will fit the head without excessive wrinkling or distortion. The forming surface of the form may be generally plain, but in the example shown the surface is formed with ridges 11 and concavities 12 therebetween to provide a configured surface of the desired design against which the article may be formed by fluid pressure. For the purpose of providing a low pressure area at the surface of the form 10, a pipe 13 connects with the hollow interior 14 of the form and venting apertures 15 are provided extending from said interior to the outer surface of the form to permit escape of air from between the article and the form. In the example shown, the vents 15 are located at an offset 16 of the form near and parallel to the edge of the article, but additional vents may be provided at other positions on the form where air or gases might become trapped, depending upon the engraved design of the form.

Wherever it is desired to provide ornaments of contrasting color, as for instance at the spaced flower centers 17, 18, 19, 20 and 21, that area of the design to be covered by the ornament is sunk below the other parts of the surface as at 22 to such a distance as to protect the ornament when the cap body is drawn over the form. Pieces of sheet rubber 23 or other suitable plastic material, either vulcanized or unvulcanized, but preferably the latter, are placed in the cavities. The pieces are cut preferably to fit the recesses 22 and may be secured in place by moistening them slightly, as with a solvent of the rubber or other material employed. The body 24 of the cap may be prepared from unvulcanized sheet material such as rubber without ornament and, after it is seamed together in the general form of the article, it is drawn over the form and over the ornaments in the recesses. The air may then be exhausted from the form by means of the pipe 13 and the dominating atmospheric pressure causes the body of the article to conform to the form.

Portions of the cap body over the recesses 22 are forced into the recesses where they engage the ornaments and are adhered thereto during vulcanization by softening of the plastic material under the influence of heat. Due to the depth of these recesses, the material of the body is formed with elevated portions 25 corresponding generally to the shape of the recesses 22, but due to sealing off of the recesses by contact of the body material at their rims in advance of the bottoming of the stock, the zone of adhesion between the body and the ornament is slightly smaller than the ornament, so that the ornament 23 slightly overhangs its pedestal, as as 26, giving it a three dimensional appearance. The amount of overhang depends upon the amount of air remaining in the corners of the recess or upon the size of the ornament with respect to that of the recess, and may be controlled by control of the amount of air exhausted, or by vents provided at the recesses, or by the relative shape and size of the recesses with relation to the shape and size of the ornaments, so that conditions from no overhang to a decided one may be obtained at will.

In addition to the forming of the body into the recesses 22 to adhere it to the ornaments of contrasting color, the entire body of the article may be formed with additional embossing in the same operation and the two ornamentations may be accurately correlated in registry with each other, as for example, the body material may be formed about the flower center 17 with embossed petals 30, and the ornaments themselves may partake of this embossing where the bottoms of the recesses 22 are engraved.

The form with the article thereon may be placed in an open steam vulcanizer and the pipe 13 connected to a vacuum line or to the atmosphere and steam under pressure may be allowed to contact with the exposed surface of the article to hold it in shape and simultaneously to vulcanize it. After vulcanization, the article may be reversed to bring the ornaments to the outside.

Before vulcanization the sheet material of the body and the ornaments is provided with a coating of powdered starch or similar dusting powder to keep it from adhering where not desired. This is done during the calendering of the material to sheet form and permits handling. After the body is assembled over the ornaments, the stretching of the material of the body into the recesses separates the dust particles so that the body is more adhesive at the stretched portions because of exposing the body material, and this assists in adhering the ornaments without cement.

While one design has been shown to illustrate the manner of carrying out the invention, numerous other designs may be employed.

Variations may be made without departing from the scope of the invention as it is defined by the following claims.

I claim:

1. The method of making an article of rubber-like material which comprises forming a body of rubber-like sheet material, providing a form with a deep recess to receive an ornament of less depth, locating an ornament in the bottom of said recess, placing said body upon the form across the mouth of the recess, and exhausting air from between said body and said form to contact said body with said ornament.

2. The method of making an article of rubber-like material which comprises forming a body of unvulcanized sheet material, providing a form with a deep recess to receive an ornament of less depth, locating an ornament of rubber-like material contrasting in color to said body in the bottom of said recess, placing said body upon the form across the mouth of the recess, exhausting air from between said body and said form to contact said body with said ornament, and vulcanizing the article.

3. The method of making an article of rubber-like material which comprises forming a body of unvulcanized sheet material, providing a form with a deep recess to receive an ornament of less depth, locating an ornament of rubber-like material in the bottom of said recess, placing said hollow body upon the form across the mouth of the recess, providing a dominating fluid pressure over said body to force it into contact with said ornament, and vulcanizing said article.

4. The method of making a hollow article of rubber-like material which comprises forming a hollow body of dusted unvulcanized rubber-like sheet material, providing a form with a recess to receive and protect an ornament, locating an ornament of rubber-like material in said recess below the general surface of the form, drawing said body over said form without contact with said ornament, stretching said body into said recess to adhere it to said ornament, and vulcanizing the article.

5. The method of making a hollow article of rubber-like material which comprises forming a hollow body of rubber-like sheet material, providing a form with a plurality of spaced deep recesses to receive ornaments, locating an ornament of rubber-like material of less depth in each recess of the form, drawing said hollow body over the form, forcing the material of said body over said recesses into contact with said ornaments, and vulcanizing the article while it is on the form.

6. The method of making a hollow article of rubber-like material which comprises forming a plain hollow body of unvulcanized rubber-like sheet material, providing a form with an engraved surface having spaced deep recesses therein to receive ornaments, placing an ornament of rubber-like material of less depth in each recess, drawing the article over the form without contacting the ornament, applying fluid pressure to the article to conform it to said engraving and simultaneously to adhere it to said ornaments within said recesses, and vulcanizing said article while it is on said form.

HELEN E. WRIGHT.